United States Patent
Kim

(10) Patent No.: US 11,199,704 B2
(45) Date of Patent: *Dec. 14, 2021

(54) HEAD-UP DISPLAY FOR VEHICLE

(71) Applicant: HYUNDAI MOBIS CO., LTD., Seoul (KR)

(72) Inventor: Byung Ki Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 112 days.

This patent is subject to a terminal disclaimer.

(21) Appl. No.: 16/674,811

(22) Filed: Nov. 5, 2019

(65) Prior Publication Data

US 2020/0142192 A1    May 7, 2020

(30) Foreign Application Priority Data

Nov. 7, 2018  (KR) .......................... 10-2018-0135687

(51) Int. Cl.
*G02B 27/01*    (2006.01)

(52) U.S. Cl.
CPC .. *G02B 27/0149* (2013.01); *G02B 2027/0159* (2013.01)

(58) Field of Classification Search
CPC .................................................. G02B 27/01
See application file for complete search history.

(56) References Cited

U.S. PATENT DOCUMENTS

| | | | | |
|---|---|---|---|---|
| 6,504,518 B1* | 1/2003 | Kuwayama | ............ | G02B 27/01 345/7 |
| 2014/0368097 A1* | 12/2014 | Yomogita | .......... | G02B 27/0149 312/23 |

FOREIGN PATENT DOCUMENTS

KR        10-1558658 B1    10/2015

* cited by examiner

*Primary Examiner* — Roy P Rabindranath
(74) *Attorney, Agent, or Firm* — NovoTechIP International PLLC

(57) ABSTRACT

Disclosed is a head-up display for a vehicle. The head-up display includes a housing having an internal space formed therein and an entrance formed on one side thereof, a holder unit having a combiner coupled to one side of the holder unit, a moving unit positioned in the internal space of the housing, rotatably coupled to the holder unit, and coupled to the housing in such a way to reciprocate, a driving unit coupled to the moving unit and configured to move the moving unit, and a tilting unit coupled to the moving unit in such a way to slide and coupled to the driving unit, wherein when the tilting unit is moved by the driving unit, the combiner is tilted to form a cycloid trajectory based on a virtual center axis that traverses the combiner left and right.

16 Claims, 16 Drawing Sheets

HEAD-UP DISPLAY FOR VEHICLE

CROSS-REFERENCE TO RELATED APPLICATION

The present application claims priority under 35 U.S.C. § 119(a) to Korean Patent Application No. 10-2018-0135687 filed on Nov. 7, 2018 in the Korean Intellectual Property Office, which is incorporated herein by reference in its entirety.

BACKGROUND

1. Technical Field

Embodiments of the present disclosure relate to a head-up display for a vehicle and, more particularly, to a head-up display for a vehicle, which can provide vehicle information to a user.

2. Related Art

In general, a head-up display (hereinafter, referred to as an "HUD") displays various types of vehicle information on the wind shield glass of a vehicle in the form of a virtual image. Furthermore, a driver may check vehicle information while continuously keeping eyes forward while driving the vehicle.

A combiner type HUD may operate in various manners, and may operate in such a manner that a combiner is received in a vehicle and deployed, if necessary, for example. The combiner type HUD includes a horizontal type combiner HUD and a vertical type combiner HUD depending on the arrangement of a lighting apparatus according to the space where the HUD is positioned in a vehicle.

Particularly, in a conventional horizontal type combiner HUD, a combiner is horizontally moved and deployed using a lead screw. In this case, the open and close speed of the combiner is determined by the size of the lead of the lead screw and a motor speed. Accordingly, there are problems in that the deployment speed of the combiner is not fast and an angle of the combiner is adjusted depending on the size of the lead and the angle of a step motor.

FIG. 16 is a diagram illustrating a rotation displacement of a combiner in a conventional HUD for a vehicle. In FIG. 16, E is the position of a user's eye, and G1 and G2 are light paths of display light emitted by a lighting apparatus V.

Referring to FIG. 16, in the conventional combiner HUD, a center axis AX around which a combiner M rotates is positioned at the bottom of the combiner M. Therefore, if the combiner M rotates toward an optimal position of the user's eye in the state in which the lighting apparatus V outputs display light to the combiner M, the position where the display light is reflected may be changed front and back and top and bottom.

In this case, a front and back change and a top and bottom change in the reflection position of the display light may be D1 and D2, respectively. As described above, the phase of a virtual image may be deformed left and right by D1 and up and down by D2 due to the rotation of the combiner M, and may then be incident on the user's eye.

Accordingly, there is a problem in that a user may misrecognize a distorted virtual image because the user sees the distorted virtual image or may easily feel eye strain because the user continues to monitor the distorted virtual image.

The Background Art of the present disclosure is disclosed in Korean Patent No. 10-1558658 (registered on Oct. 1, 2015) entitled "Head Up Display Device For Vehicle."

SUMMARY

Various embodiments are directed to the provision of a HUD for a vehicle, wherein a combiner can be tilted based on the center of the combiner not the bottom thereof.

In an embodiment, a head-up display for a vehicle includes a housing having an internal space formed therein, wherein an entrance is formed on one side of the housing, a holder unit having a combiner coupled to one side of the holder unit, wherein the combiner enters or exits through the entrance, a moving unit positioned in the internal space of the housing, rotatably coupled to the holder unit, and coupled to the housing in such a way to reciprocate, wherein when the moving unit reciprocates, the combiner is received in the internal space of the housing or exposed externally through the entrance of the housing, a driving unit coupled to the moving unit and configured to move the moving unit, and a tilting unit coupled to the moving unit in such a way to slide and coupled to the driving unit, wherein when the tilting unit is moved by the driving unit, the combiner is tilted to form a cycloid trajectory based on a virtual center axis that traverses the combiner left and right.

The holder unit includes a holder shaft mounted on the moving unit, a holder rotation member coupled to the holder shaft, a holder member to which the combiner is coupled, and a tilting guide member coupled to the holder shaft and configured to guide the tilting of the holder member.

The holder shaft operates in conjunction with the moving unit through the moving unit, wherein both ends of the holder shaft have squared shapes and are mounted on the holder rotation member and the tilting guide member, respectively.

The holder rotation member includes a first holder rotation unit on which the holder shaft is mounted and a second holder rotation unit positioned in the first holder rotation unit, wherein the holder member is inserted into the second holder rotation unit to limit the tilting of the holder member.

The holder member includes a holder unit to which the combiner is coupled, an arc unit through which the holder shaft penetrates, an arc protrusion unit protruding from the arc unit and inserted into the holder rotation member, and a pinion unit downward extended from the holder unit, having a set of teeth formed on curvature of the pinion unit, and engaged with the tilting unit.

The tilting guide member includes a first tilting guide unit to which the holder shaft is coupled, a second tilting guide unit upward extended from both ends of the first tilting guide unit, a third tilting guide unit having both ends coupled to the second tilting guide unit, and a fourth tilting guide unit penetrated by the third tilting guide unit and rotatably mounted on the holder member.

The holder unit includes a guide pin protruding from the outside of the holder rotation member, and a guide groove for entrance and exit is formed in a portion of the housing coming into contact with the guide pin and provides a movement route of the holder rotation member.

The tilting unit includes a sliding member coupled to the moving unit in such a way to slide, moved by the driving unit in a state in which a movement of the moving unit has been stopped, and configured to apply an external force to the holder member so that the holder member is tilted.

The sliding member includes a sliding plate unit moved by the driving unit and a rack gear unit protruding from the sliding plate unit and geared with the holder member.

A second guide groove through which the driving unit penetrates is formed in the sliding member. The second guide groove includes a second movement route formed at the edge of the sliding member and configured to enable the sliding member to move along with the moving member as the driving unit moves and a tilting route connected to the second movement route and having a radius of curvature different from a radius of curvature of a moving trajectory of the driving unit.

A virtual center axis traversing the combiner left and right is an axis which prevents a position where display light is reflected from being changed on a reflection plane of the combiner, although the combiner is tilted.

The driving unit includes a rotation motor, a rotation member rotated by the rotation motor, and a driving pin positioned on one side of the rotation member and positioned to penetrate the moving unit and the tilting unit.

The moving unit includes a moving member coupled to the housing in such a way to slide, wherein a first guide groove through which the driving pin penetrates is formed in the moving member.

The first guide groove includes a first movement route formed at the edge of the moving member and configured to enable the moving member to move in one direction as the driving pin is moved and a pause route connected to the first movement route and having a radius of curvature corresponding to a radius of curvature of a moving trajectory of the driving pin.

The head-up display further includes a sensing unit positioned in the internal space of the housing and configured to detect a location of the moving unit. The sensing unit detects that the combiner is received in the internal space of the housing or exposed to the outside of the housing based on the detected location of the moving unit.

The sensing unit includes a first position detection member coupled to one side of the internal space of the housing and configured to detect a location of the moving unit and a second position detection member coupled to the other side of the internal space of the housing and configured to detect a location of the moving unit.

DETAILED DESCRIPTION

Figure 1:
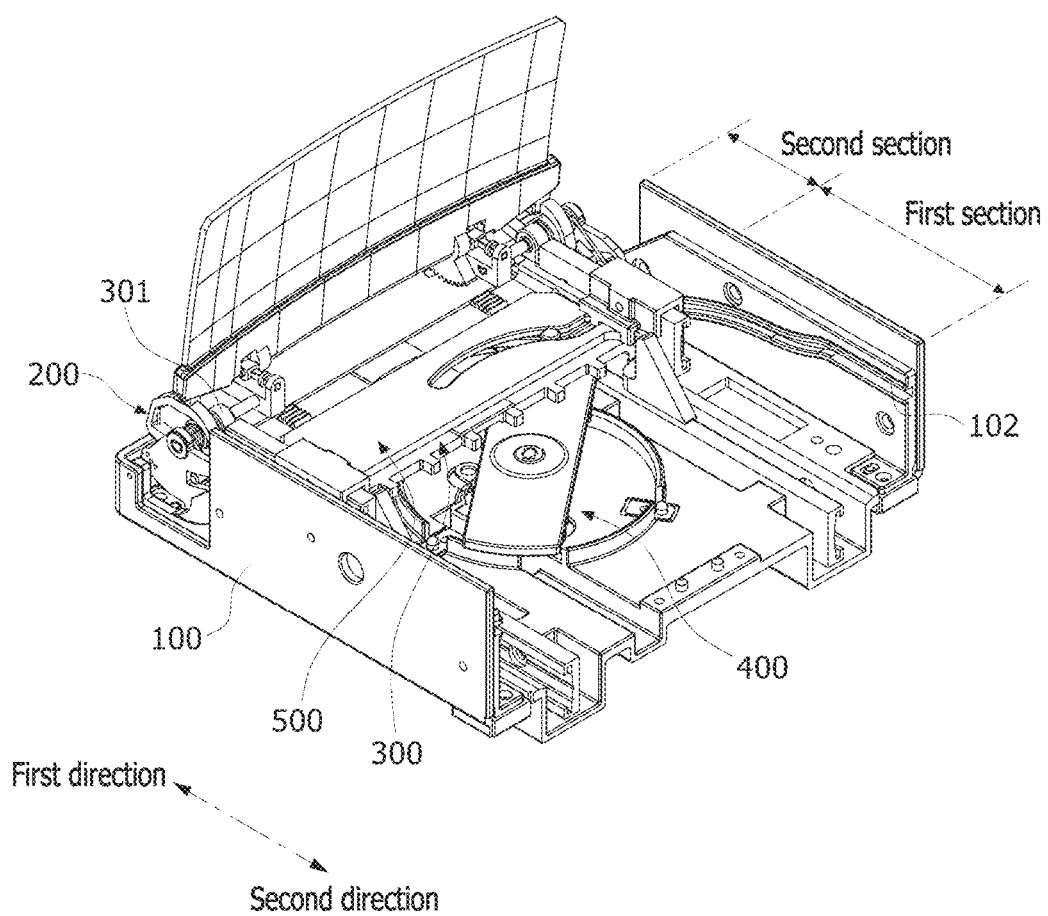
FIG. 1 is a diagram schematically illustrating an HUD for a vehicle according to an embodiment of the present disclosure.
Figure 2:
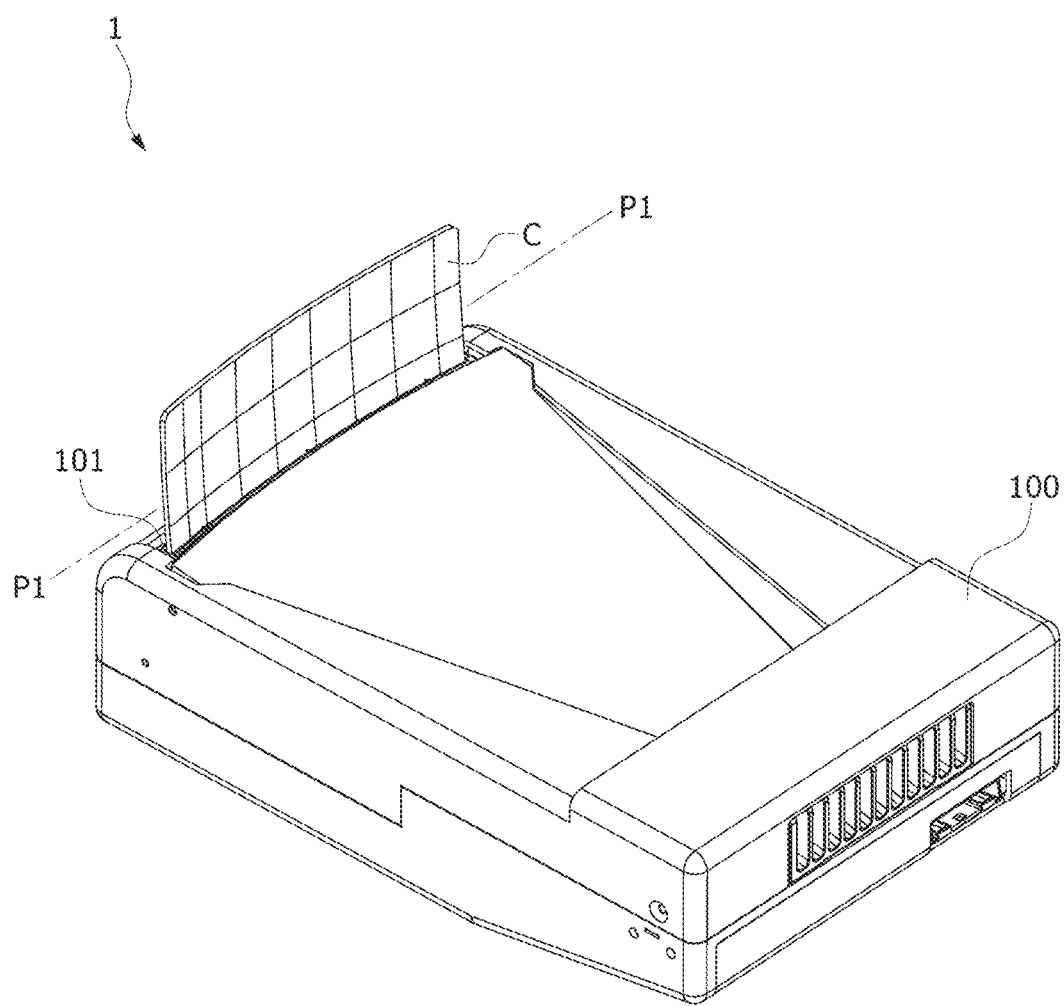
FIG. 2 is a diagram schematically illustrating the state in which a housing has been added in FIG. 1.
Figure 3:
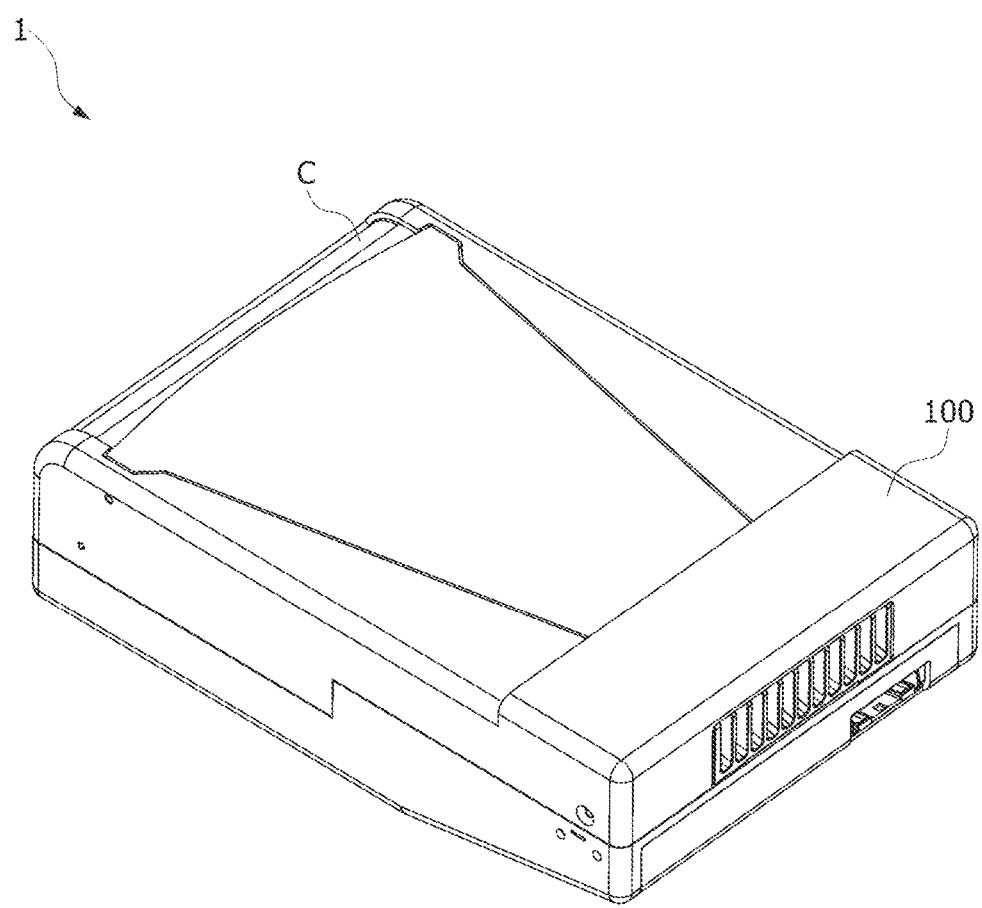
FIG. 3 is a diagram schematically illustrating the state in which a combiner has been received in the housing in FIG. 2.
Figure 4:
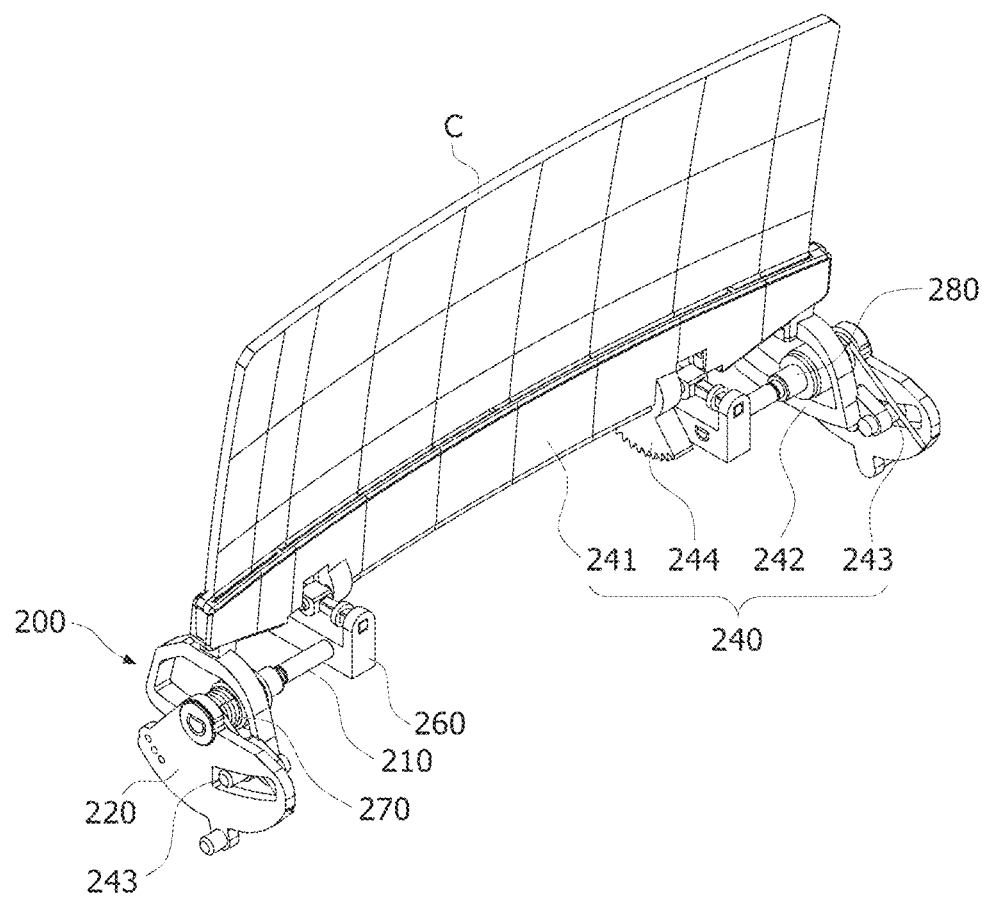
FIG. 4 is a diagram schematically illustrating a holder unit according to an embodiment of the present disclosure.
Figure 5:
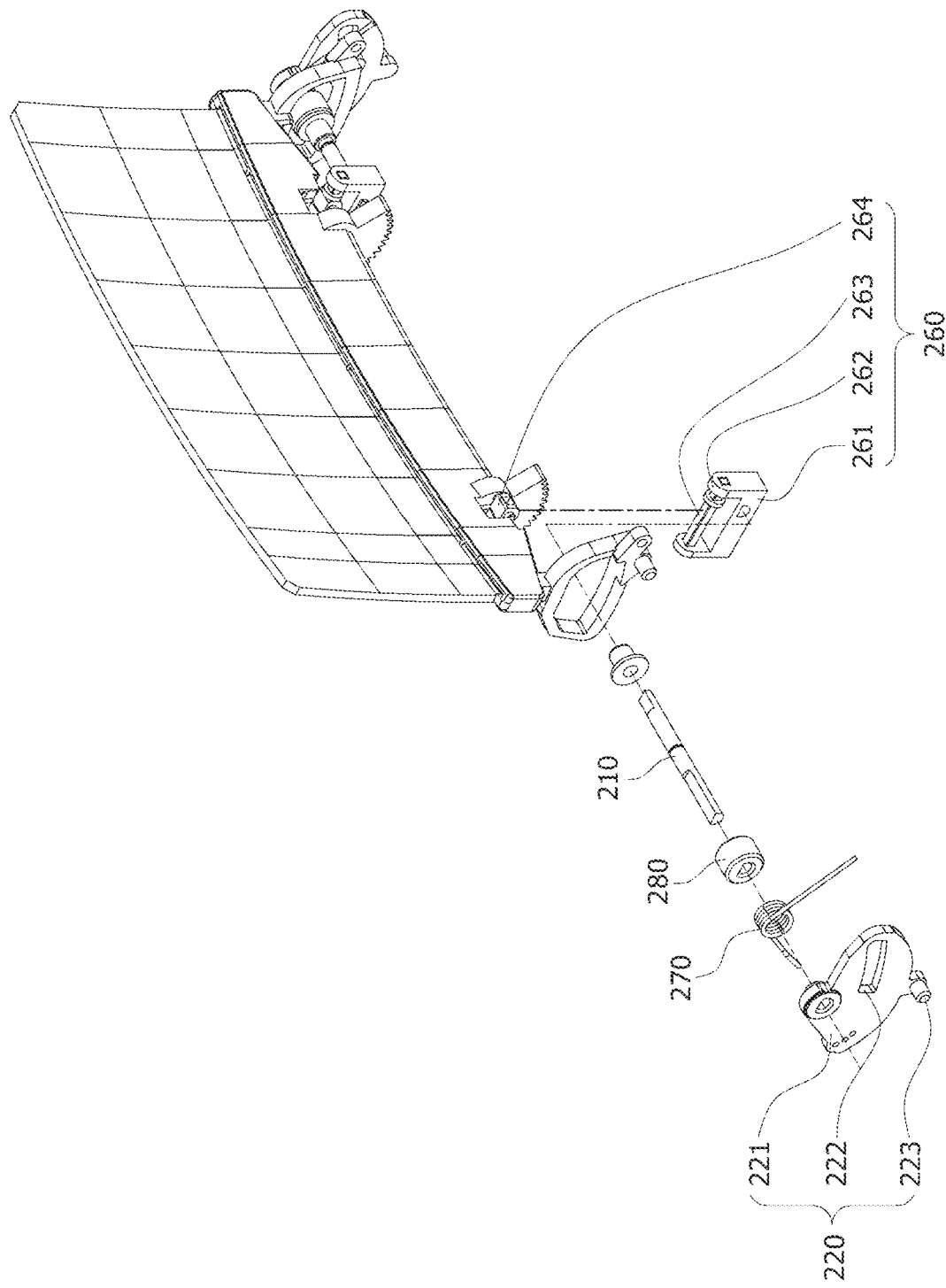
FIG. 5 is an exploded perspective view of the holder unit according to an embodiment of the present disclosure.
Figure 6:
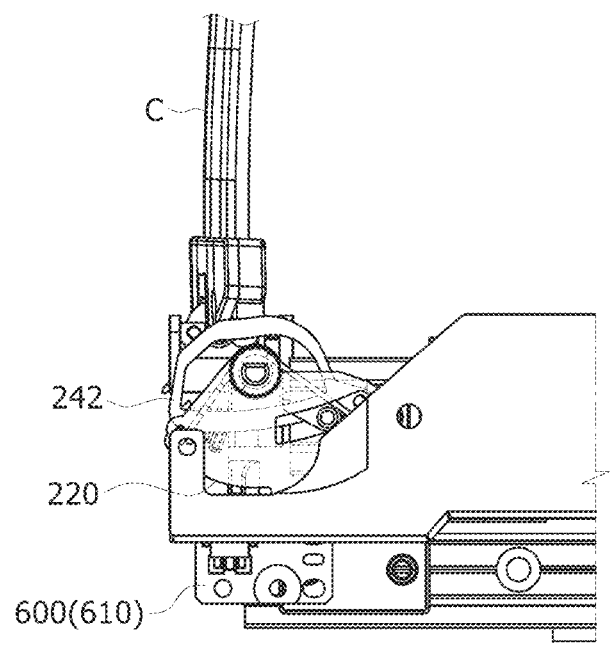
FIG. 6 is a diagram schematically illustrating the open state of the combiner according to an embodiment of the present disclosure.
Figure 7:
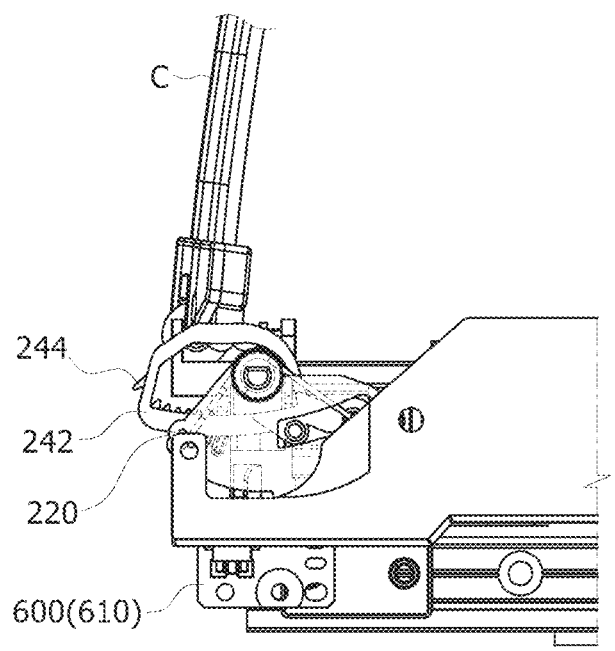
FIG. 7 is a diagram schematically illustrating the tilting state of the combiner according to an embodiment of the present disclosure.
Figure 8:
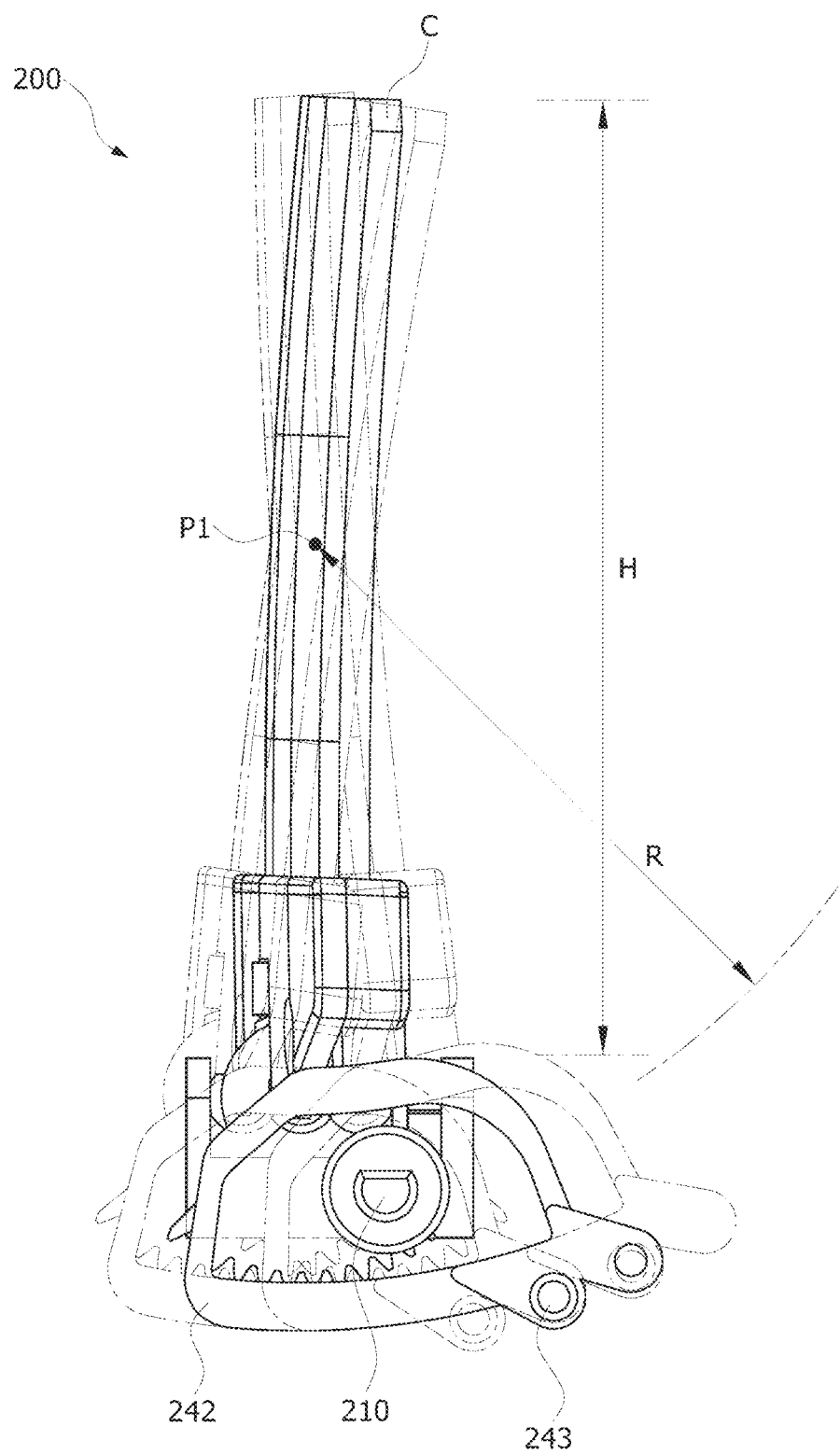
FIG. 8 is a diagram illustrating the extract of a holder member of FIG. 7.
Figure 9:
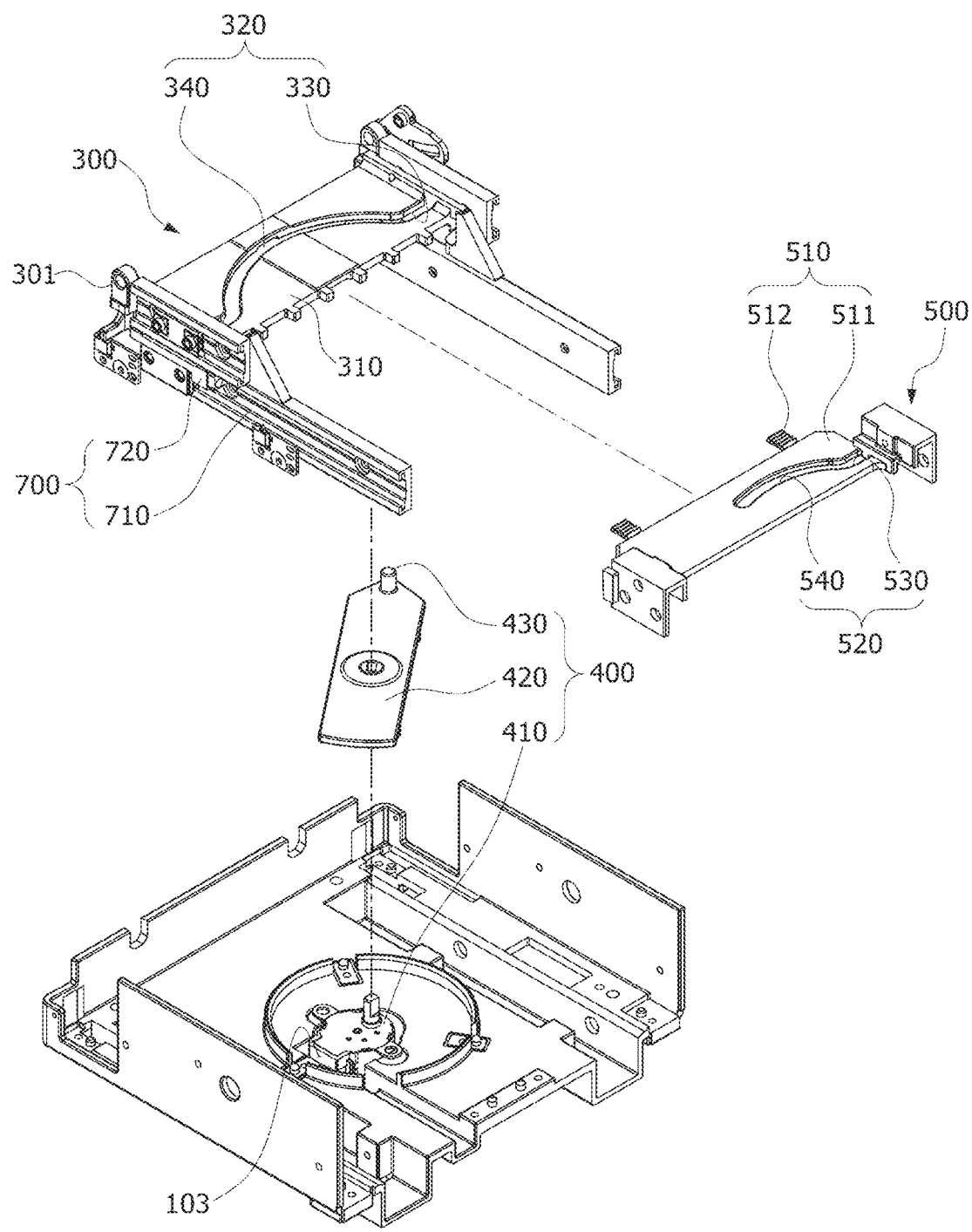
FIG. 9 is a diagram illustrating a moving unit and tilting unit separated from the housing according to an embodiment of the present disclosure.
Figure 10:
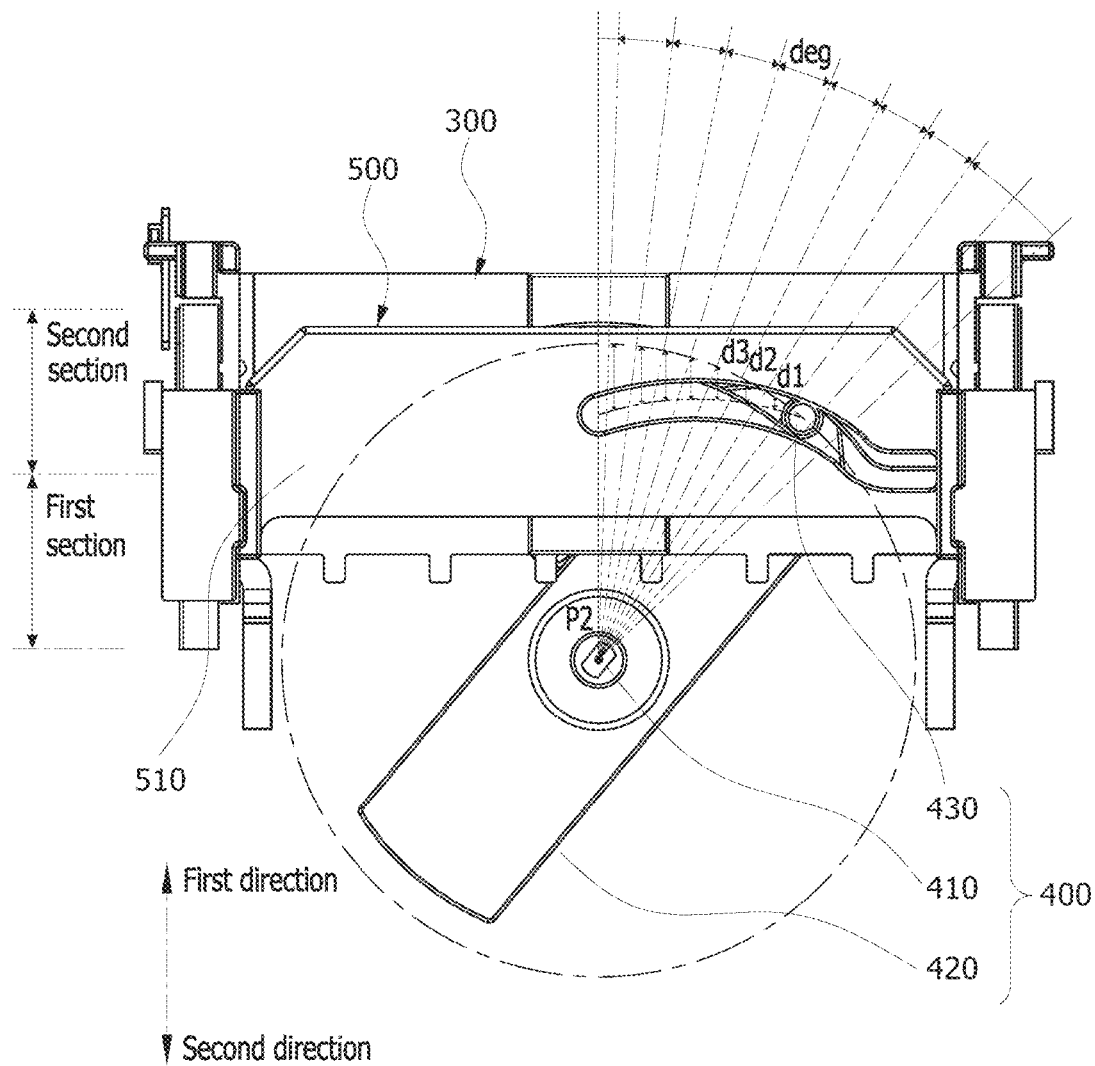
FIG. 10 is a plan view illustrating the extract of a moving unit, tilting unit and driving unit according to an embodiment of the present disclosure.
Figure 11:
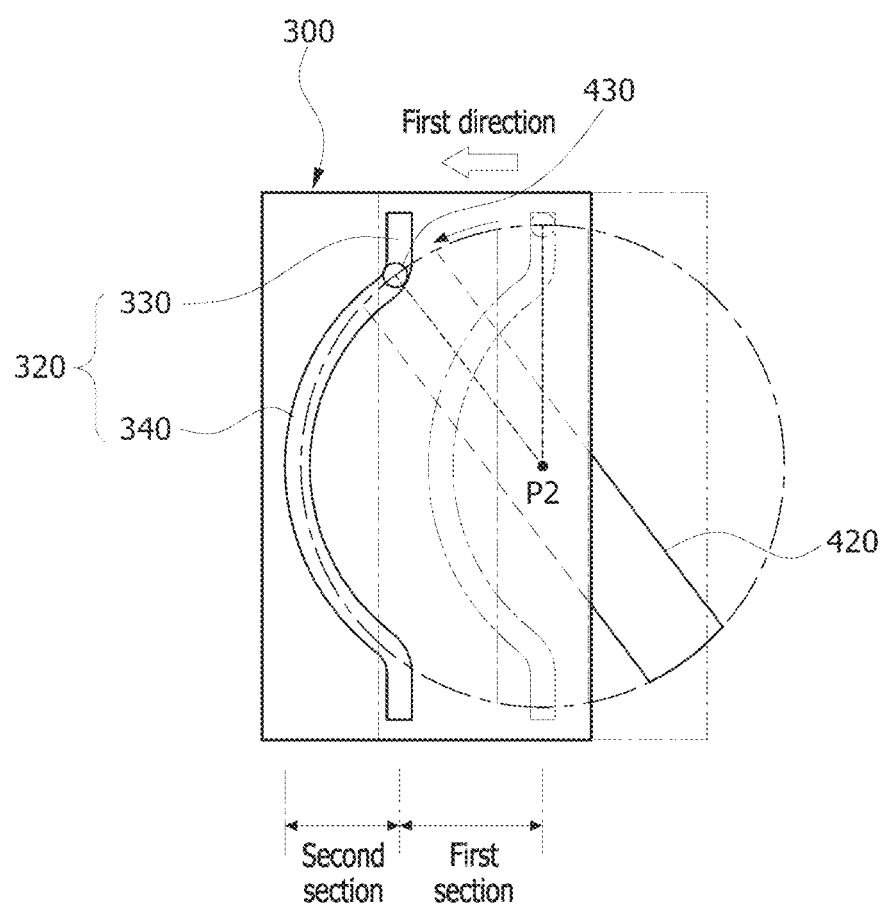
FIG. 11 is a diagram illustrating a process for a moving member to be moved by a driving pin according to an embodiment of the present disclosure.
Figure 12:
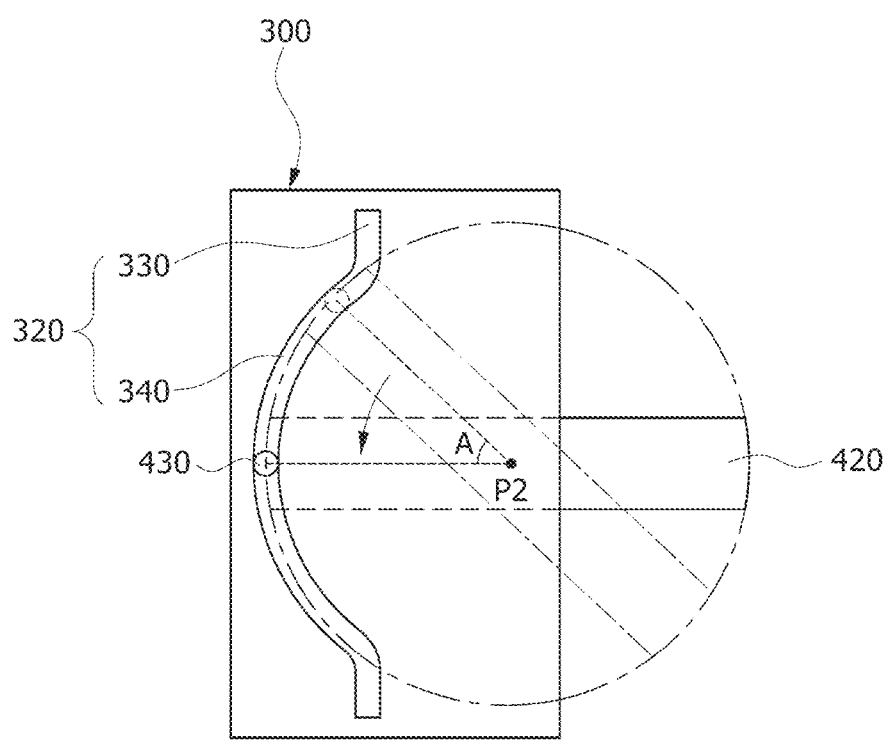
FIG. 12 is a plan view illustrating the state in which the driving pin passes along the pause route of the moving member according to an embodiment of the present disclosure.
Figure 13:
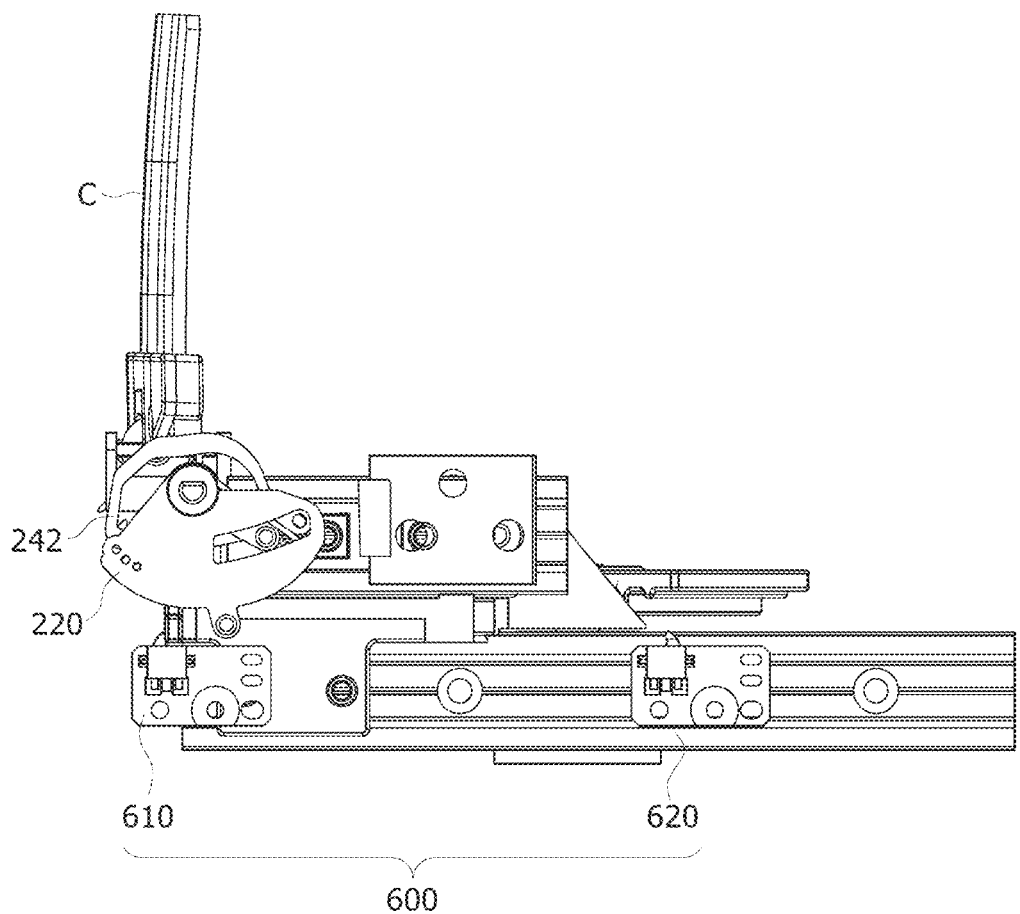
FIG. 13 is a side view of a portion where a sensing unit is positioned according to an embodiment of the present disclosure.

Hereinafter, embodiments of an HUD for a vehicle according to the present disclosure are described with reference to the accompanying drawings. In such a process, the thickness of lines or the size of elements illustrated in the drawings may have been exaggerated for the clarity of a description and for convenience' sake. Terms to be described below have been defined by taking into consideration their functions in the present disclosure, and may be different depending on an operator's intention or practice. Accordingly, such terms should be interpreted based on the overall contents of this specification.

Referring to FIGS. 1 to 15, an HUD 1 for a vehicle according to an embodiment of the present disclosure includes a housing 100, a holder unit 200, a moving unit 300, a driving unit 400 and a tilting unit 500.

The housing 100 may be an appearance and body of the HUD 1 for a vehicle according to an embodiment. An internal space may be formed in the housing 100. The holder unit 200, the moving unit 300, the driving unit 400 and the tilting unit 500 may be disposed in the internal space of the housing 100.

An entrance 101 may be formed on one side of the housing 100. A combiner C may be exposed to the outside of the housing 100 through the entrance 101 or may be received in the housing 100. The housing 100 may be positioned in the dashboard (not illustrated) of a vehicle. The entrance 101 may penetrate one side of the combiner C in a form corresponding to the one side.

A display module 10 (refer to FIG. 14) may be positioned on one side of the housing 100. In some embodiments, the display module 10 may be positioned in the dashboard of a vehicle. The display module 10 generates and emits an image or video to the combiner C.

The display module 10 is connected to an electronic control unit (ECU) (not illustrated) for performing an overall electronic control function within a vehicle, and may generate an image or video by receiving various pieces of information related to a vehicle, such as the driving speed and engine state of the vehicle. For example, if the display module 10 is connected to a device, such as a navigator, the display module 10 may generate an image or video by receiving various types of position information related to a movement route to a specific destination.

An image or video generated by the display module 10 may be reflected by a mirror (not illustrated), may be reflected again by the combiner C, and may then be provided to the outside. Accordingly, a driver can check vehicle information even without a device, such as a navigator. The combiner C may be a semi-transparent reflection member having a sheet form, for example, and may clearly radiate a vehicle information image or video to the outside.

The combiner C may be coupled to one side of the holder unit 200. The combiner C may enter or exit through the entrance 101. The holder unit 200 may be moved or tilted by the moving unit 300 to be described below, and may be precisely tilted by the tilting unit 500. The holder unit 200 will be described later in detail.

The moving unit 300 is positioned in the internal space of the housing 100, and may be rotatably coupled to the holder unit 200. Furthermore, the moving unit 300 may be coupled to the housing 100 in such a way to reciprocate.

As the moving unit 300 reciprocates within the internal space of the housing 100 by the driving unit 400 to be described below, the combiner C may be received in the internal space of the housing 100 or may be exposed to the outside through the entrance 101 of the housing 100. The moving unit 300 will be described later in detail.

The driving unit 400 is coupled to the moving unit 300 and may move the moving unit 300. Furthermore, the driving unit 400 may also move the tilting unit 500 to be described below. Anything capable of generating motive power may be used as the driving unit 400. An example of the driving unit 400 will be described later.

The tilting unit 500 is coupled to the moving unit 300 in such a way to slide, and may be coupled to the driving unit 400. As the tilting unit 500 is moved by the driving unit 400, the tilting unit 500 enables the combiner C to be tilted to form a cycloid trajectory based on a virtual center axis P1 that traverses the combiner C left and right.

That is, the virtual center axis P1 is a straight line that becomes the center when the combiner C is rotated. More specifically, the virtual center axis P1 that traverses the combiner C left and right may be an axis that prevents the position where display light is reflected from being changed on the reflection plane of the combiner C, although the combiner C is tilted.

Accordingly, when the combiner C rotates toward an optimal position of a user's eye in the state in which the display module 10 outputs display light to the combiner C, the position where the display light is reflected may not be changed. The tilting unit 500 for such a function will be described later in detail.

The holder unit 200 may include a holder shaft 210, a holder rotation member 220, a holder member 240, a tilting guide member 260 and an elastic member 270, for example.

The holder shaft 210 is mounted on the moving unit 300. For example, the holder shaft 210 has a rod shape. A pair of the holder shafts 210 may be spaced apart and mounted on a moving mounting unit 301 formed in the moving unit 300. The holder shaft 210 operates in conjunction with the moving unit 300. Both ends of the holder shaft 210 may be coupled to the holder rotation member 220 and the tilting guide member 260.

The holder rotation member 220 may be coupled to the holder shaft 210. The holder rotation member 220 may be rotated with the holder shaft 210. For example, a part of the end of the holder shaft 210 may be formed in a polygon shape. A portion that belongs to the holder rotation member 220 and into which the holder shaft 210 is inserted may be recessed in a shape corresponding to the end of the holder shaft 210. Accordingly, the holder shaft 210 and the holder rotation member 220 may be rotated together.

The holder rotation member 220 includes a first holder rotation unit 221 and a second holder rotation unit 222. The first holder rotation unit 221 is mounted on the end of the holder shaft 210. The holder member 240 is rotatably inserted into the second holder rotation unit 222 of the first holder rotation unit 221, thus limiting tilting. For example, the second holder rotation unit 222 has a hole shape having a curve length. The holder member 240 moves by the length of the second holder rotation unit 222, thus limiting a tilting angle.

The holder member 240 may hold the combiner C. The holder member 240 may be engaged with the tilting unit 500 to be described below in a rack and pinion manner, and may be moved along a curve route. The holder member 240 includes a holder unit 241, an arc unit 242, an arc protrusion unit 243 and a pinion unit 244.

The combiner C may be coupled to the holder unit 241. A groove (not illustrated) into which the combiner C may be inserted may be formed on one side of the holder unit 241. Various methods, such as adhesives, tight-fitting and bolt fastening, may be used as a method of coupling the holder unit 241 and the combiner C, and the method is not limited to a specific method.

At least part of the arc unit 242 has an arc shape, and the arc unit 242 may be formed on one side of the holder unit 241. In this case, the radius R of curvature of the arc unit 242 may be approximately ½ of the height H of the combiner C, for example. The arc unit 242 has a belt-shaped section. A space is formed in the arc unit 242, and thus the holder shaft 210 can penetrate the art unit 242.

The arc protrusion unit 243 protrudes from the arc unit 242 and is inserted into the holder rotation member 220. For example, the arc protrusion unit 243 is inserted into the second holder rotation unit 222, and may be moved within the area of the second holder rotation unit 222.

The pinion unit 244 is downward extended from the holder unit 241. A set of teeth is formed on curvature of the pinion unit 244, so the pinion unit 244 is engaged with the tilting unit 500. For example, a curved surface may be formed at the bottom of the pinion unit 244, and a set of teeth may be formed on the curved surface.

The tilting guide member 260 is coupled to the holder shaft 210, and guides the tilting of the holder member 240. For example, the tilting guide member 260 mounted on the end of each of the holder shafts 210 may guide the holder member 240 so that the tilting of the combiner C is stably performed on an operating route.

The tilting guide member 260 may include a first tilting guide unit 261, a second tilting guide unit 262, a third tilting guide unit 263 and a fourth tilting guide unit 264.

The first tilting guide unit 261 may be formed to have a length in the progress direction of the moving unit 300. A squared hole is formed in the first tilting guide unit 261, so that the holder shaft 210 may be inserted into the squared hole.

The second tilting guide unit 262 is extended upward at both ends of the first tilting guide unit 261. The second tilting guide unit 262 may be positioned to face each other.

Both ends of the third tilting guide unit 263 are coupled to the second tilting guide unit 262. For example, the third tilting guide unit 263 has a squared pole shape and may be formed to have a length in the progress direction of the moving unit 300.

The third tilting guide unit 263 penetrates the fourth tilting guide unit 264, and the fourth tilting guide unit 264 is rotatably mounted on the holder member 240. For example, the fourth tilting guide unit 264 may have a top coupled to the holder unit 241 by a pin and may be rotated. The third tilting guide unit 263 may penetrate the bottom of the fourth tilting guide unit 264.

The holder unit 200 may include a guide pin 223. The guide pin 223 may protrude from the outside of the first holder rotation unit 221 of the holder rotation member 220. Furthermore, a guide groove 102 (refer to FIG. 1) for entrance and exit for providing a movement route to the holder rotation member 220 may be formed in a portion that belongs to the housing 100 and that comes into contact with the guide pin 223.

The moving unit 300 may be moved by the driving unit 400. The holder unit 200 may be moved by the moving unit 300. In this process, the guide pin 223 may be guided by the guide groove 102 for entrance and exit. The guide groove 102 for entrance and exit may be formed in the inner side of the housing 100.

The guide groove 102 for entrance and exit may be downward tilted toward a first direction. In the state in which the combiner C has been received in the housing 100, the guide pin 223 may be positioned at a height similar to the bottom of the holder shaft 210 included in the holder unit 200 and the housing 100. While the holder unit 200 moves in the first direction, the guide pin 223 may move relatively downward compared to the holder shaft 210 of the holder unit 200.

Furthermore, the holder rotation member 220 and holder member 240 of the holder unit 200 may be rotated around the holder shaft 210. Accordingly, the combiner C may be positioned to be exposed to the outside through the entrance 101 of the housing 100 and to become approximately perpendicular to the housing 100.

In addition, the elastic member 270 may be positioned to elastically support the holder rotation member 220 and the holder member 240. When an external force applied to the holder member 240 is removed, the elastic member 270 enables the holder member 240 to return to a position before the holder member 240 was tilted.

The elastic member 270 may be a torsion spring, for example. A coil portion of the torsion spring may surround the holder shaft 210. Furthermore, one end of the torsion spring may be supported by a part of the holder member 240, and the other end of the torsion spring may be supported by a part of the holder rotation member 220. That is, the torsion spring may elastically support the holder member 240 and the holder rotation member 220 so that the holder member 240 and the holder rotation member 220 are relatively rotated each other and then returned to their initial positions.

Furthermore, the holder shaft 210 penetrating a spacer 280. The spacer 280 may limit a movement of the elastic member 270. The spacer 280 may be positioned the elastic member 270 and the moving mounting unit 301.

When an external force is applied to the holder member 240 of the holder unit 200, the combiner C may be tilted. The external force applied to the holder member 240 may be generated by the tilting unit 500. To this end, the tilting unit 500 may include a sliding member 510, for example.

The sliding member 510 may be coupled to the moving unit 300 in such a way to slide. The sliding member 510 may be moved by the driving unit 400 in the state in which a movement of the moving unit 300 has been stopped. As an external force is applied to the holder member 240, the sliding member 510 enables the holder member 240 to be tilted.

More specifically, as the driving unit 400 operates, the tilting unit 500 may be moved along with the moving unit 300 in the first section of the internal space of the housing 100. Thereafter, if the driving unit 400 continues to operate, the movement of the moving unit 300 may be stopped. The tilting unit 500 may be moved toward the holder unit 200 in the second section of the internal space of the housing 100. At this time, the combiner C may be tilted.

In contrast, as the driving unit 400 operates reversely in the state in which a movement of the moving unit 300 has been stopped, the tilting unit 500 may become distant from the holder unit 200. At this time, the combiner C may return to a position before tilted. Furthermore, the tilting unit 500 may be moved in the second direction that becomes distant from the holder unit 200 along with the moving unit 300. In this case, a process for the sliding member 510 and the moving unit 300 to be moved by the driving unit 400 and the driving unit 400 will be described later in detail.

As described above, the tilting unit 500 is configured to have the sliding member 510 moved by the driving unit 400. The sliding member 510 may include a sliding plate unit 511 and a rack gear unit 512.

The sliding plate unit 511 is moved by the driving unit 400. The rack gear unit 512 protrudes from the sliding plate unit 511 and is geared with the holder member 240. For example, a pair of the rack gear units 512 that forward protrude from the front end of the sliding plate unit 511 may be geared with the pinion units 244.

The driving unit 400 may include a rotation motor 410, a rotation member 420 and the driving pin 430, for example.

The rotation motor 410 may generate torque. The rotation motor 410 may be positioned in an installation space 103 within the housing 100. In some embodiments, the rotation motor 410 may be positioned outside the housing 100, but the present disclosure is not limited thereto.

The rotation member 420 may be rotated by the rotation motor 410. The rotation member 420 may have a stick shape, for example. Furthermore, a central point P2 of the rotation member 420 may be coupled to the rotation shaft of the rotation motor 410. The rotation member 420 may be positioned adjacent to the bottom of the housing 100.

The driving pin 430 may be formed on one side of the rotation member 420. More specifically, the driving pin 430 may be positioned upward from the top of any one end of the rotation member 420 having a stick shape. The driving pin 430 may be integrated with the rotation member 420.

The driving pin 430 may be positioned to penetrate the moving unit 300 and the tilting unit 500. The rotation member 420 may be rotated by the rotation motor 410. At this time, the driving pin 430 may move the moving unit 300 and the tilting unit 500 at the same time, may move only the moving unit 300, or may move only the tilting unit 500, while rotating at a given angle along with the rotation member 420.

The driving unit 400 may rotate the rotation member 420 so that the moving unit 300 repeatedly reciprocates rectilinearly. Furthermore, the combiner C may be exposed or received rapidly by receiving the torque of the rotation member 420.

A process for the moving unit 300 to be moved by the rotation of the driving pin 430 will be described in detail below.

The moving unit 300 may include a moving member 310. The moving member 310 may be coupled to the housing 100 in such a way to slide. The moving member 310 may reciprocate rectilinearly in the first direction or in the second direction. Accordingly, the combiner C may be exposed to the outside of the housing 100 or may be received in the housing 100.

A first guide groove 320 may be formed in the moving member 310. The driving pin 430 may penetrate the first guide groove 320. Accordingly, as the driving pin 430 is rotated around the reference point of the rotation member 420, the moving member 310 can move. To this end, the first guide groove 320 may penetrate a part of the moving member 310 up and down so that the driving pin 430 passes through the first guide groove 320.

The first guide groove 320 may include a first movement route 330 and a pause route 340, for example.

The first movement route 330 may be formed at the edge of the moving member 310. As the driving pin 430 is moved, the first movement route 330 enables the moving member 310 to move in one direction. The first movement route 330 may have a straight-line shape perpendicular to the moving direction of the moving member 310, for example, but is not limited thereto. The first movement route 330 may include various modified examples, such as that it is formed to have a given angle to the moving direction of the moving member 310.

The pause route 340 may be connected to the first movement route 330. Furthermore, the pause route 340 may have a radius of curvature corresponding to a radius of curvature of the moving trajectory of the driving pin 430. That is, the pause route 340 may have the same radius of curvature as the moving trajectory of the driving pin 430. Accordingly, in a process for the driving pin 430 to move along the pause route 340, that is, a given angle range A (refer to FIG. 12), the moving member 310 may maintain a current position without moving in any one of the first direction and the second direction.

A second guide groove 520 through which the driving pin 430 penetrates may be formed in the sliding member 510. The second guide groove 520 may include a second movement route 530 and a tilting route 540, for example.

The second movement route 530 may be formed at the edge of the sliding plate unit 511 of the sliding member 510. As the driving pin 430 is moved, the second movement route 530 enables the sliding member 510 to move along with the moving member 310.

The second movement route 530 may have a straight-line shape perpendicular to the moving direction of the sliding member 510, for example, but is not limited thereto. The second movement route 530 may include various modified examples, such as that it is formed to have a given angle to the moving direction of the sliding member 510.

The tilting route 540 may be connected to the second movement route 530. The tilting route 540 may be formed so that the straight-line moving distance of the sliding member 510 increases constantly as the driving pin 430 rotates. The tilting route 540 may have a radius of curvature different from that of the moving trajectory of the driving pin 430. For example, the radius of curvature of the tilting route 540 may be greater than that of the moving trajectory of the driving pin 430.

In contrast, the radius of curvature of the tilting route 540 may be smaller than that of the moving trajectory of the driving pin 430. That is, the tilting route 540 may have a shape closer to the central point P2, that is, the center of the rotation of the rotation member 420, than to the pause route 340 as the tilting route 540 becomes distant from the second movement route 530.

As described above, the arc shape of the second guide groove 520 may be closer to the central point P2 compared to the arc shape of the first guide groove 320. Accordingly, the moving member 310 does not move along the pause route 340 of the first guide groove 320, and the sliding member 510 may be moved in the first direction compared to the moving member 310. In this case, the shape of the tilting route 540 is not limited thereto, and may have any shape if only the sliding member 510 can move in a process for the driving pin 430 to move along the pause route 340.

In a process for the driving pin 430 to move along the tilting route 540, the moving member 310 may maintain a stop state and the sliding member 510 may be moved in the first direction or the second direction.

Accordingly, if the moving member 310 and the sliding member 510 are moved toward the holder unit 200 by the driving pin 430, the moving member 310 may be moved by the first movement route 330 and the sliding member 510 may be moved by the second movement route 530 along with the moving member 310. Thereafter, if the driving pin 430 continues to be rotated, the moving member 310 may maintain the stop state by the pause route 340 and the sliding member 510 may be moved toward the holder unit 200 by the tilting route 540. That is, the moving member 310 does not move and only the sliding member 510 may be moved minutely.

In the HUD 1 for a vehicle according to an embodiment of the present disclosure, the sliding member 510 may move by L whenever the rotation member 420 is rotated at a given angle (deg). This is represented by the following equation.

$$d_n = d_{n-1} + L, \text{ wherein } n>1, d_1 = L \qquad \text{[Equation]}$$

Accordingly, the moving distance of the sliding member 510 according to a rotation angle of the driving unit 400 may be precisely predicted based on the tilting route 540. The combiner C may be adjusted to a designed angle based on the moving distance of the sliding member 510.

The HUD 1 for a vehicle according to an embodiment may further include a sensing unit 600.

The sensing unit 600 may be positioned in the internal space of the housing 100 to detect a position of the moving unit 300, and may indirectly detect that the combiner C has been received in the internal space of the housing 100 or exposed to the outside of the housing 100 based on the detected position of the moving unit 300.

The sensing unit 600 may include a first position detection member 610 and a second position detection member 620, for example.

The first position detection member 610 is coupled to one side of the internal space of the housing 100, and may detect a position of the moving unit 300. The second position detection member 620 is coupled to the other side of the internal space of the housing 100, and may detect a position of the moving unit 300.

The first position detection member 610 and the second position detection member 620 may be electrically coupled by a controller (not illustrated). The controller may indirectly determine the reception or exposure state of the combiner C based on which one of the first position detection member 610 and the second position detection member 620 has detected the position of the moving unit 300.

The first position detection member 610 and the second position detection member 620 may be configured in a switch manner, for example, but are not limited thereto and may include various modified embodiments, such as a contact sensor manner in which an electrical signal is generated when the position detection member comes into contact with the moving unit 300.

For example, the first position detection member 610 and the second position detection member 620 may be configured in a switch manner. Furthermore, the moving unit 300 may include a protrusion for position check, which protrudes from one end of the moving member 310.

As the moving member 310 is moved, it may come into contact with the first position detection member 610 or the second position detection member 620. When the first position detection member 610 comes into contact with the protrusion for position check, the controller (not illustrated) may determine that the combiner C has been exposed to the outside of the housing 100. In contrast, when the second position detection member 620 comes into contact with the protrusion for position check, the controller (not illustrated) may determine that the combiner C has been received in the housing 100.

The HUD 1 for a vehicle according to an embodiment of the present disclosure may further include a rail unit 700.

The rail unit 700 enables the moving unit 300 to move within the housing 100 smoothly. To this end, the rail unit 700 may include a rail member 710 and a rail block 720, for example.

The rail member 710 may have a rail shape, for example. The rail member 710 may be positioned in the housing 100. The rail member 710 may be integrated with the housing 100.

The rail block 720 may be coupled to the rail member 710 in such a way to move along the rail member 710. The moving unit 300 may be coupled to the rail block 720. The moving unit 300 can be moved within the housing 100 more smoothly by the rail unit 700. To this end, the shape of the rail member 710 and the rail block 720 is not limited to a specific shape, and may include any shape if the rail unit 700 enables the moving unit 300 to move smoothly within the housing 100.

An operating process of the HUD 1 for a vehicle according to an embodiment of the present disclosure will be described below. In this case, a detailed operating process of each of the units has been described above, and thus a detailed description of each unit will be omitted herein.

If a user wants to use the HUD 1 for a vehicle, the user manipulates a manipulation button (not illustrated) positioned in a dashboard (not illustrated). The driving unit 400 may be driven in response to an operation signal from the controller (not illustrated). The rotation member 420 is rotated by the rotation motor 410, and the moving unit 300 and the tilting unit 500 may be moved together in the first section. At this time, as the entire holder unit 200 is rotated, the combiner C may be exposed to the outside of the housing 100.

When the driving unit 400 continues to operate, the moving unit 300 maintains the state in which it has stopped in the second section. The tilting unit 500 may be moved toward the holder unit 200. The holder member 240 may be tilted in proportion to the distance in which the tilting unit 500 has pressed the holder member 240, and thus the combiner C may be tilted.

If the user does not use the HUD 1 for a vehicle, however, the user manipulates the manipulation button positioned in the dashboard again. Only the tilting unit 500 may be moved toward the moving unit 300 in the state in which the driving unit 400 operates and the holder unit 200 and the moving unit 300 have been stopped.

When the tilting unit 500 is moved by a given distance, the contact between the holder member 240 and the tilting unit 500 is released and the combiner C may return to a position before tilted. Thereafter, the tilting unit 500 and the holder unit 200 may be moved in the second direction along with the moving unit 300. Accordingly, while the entire holder unit 200 is rotated, the combiner C may be received in the housing 100.

Figure 14:
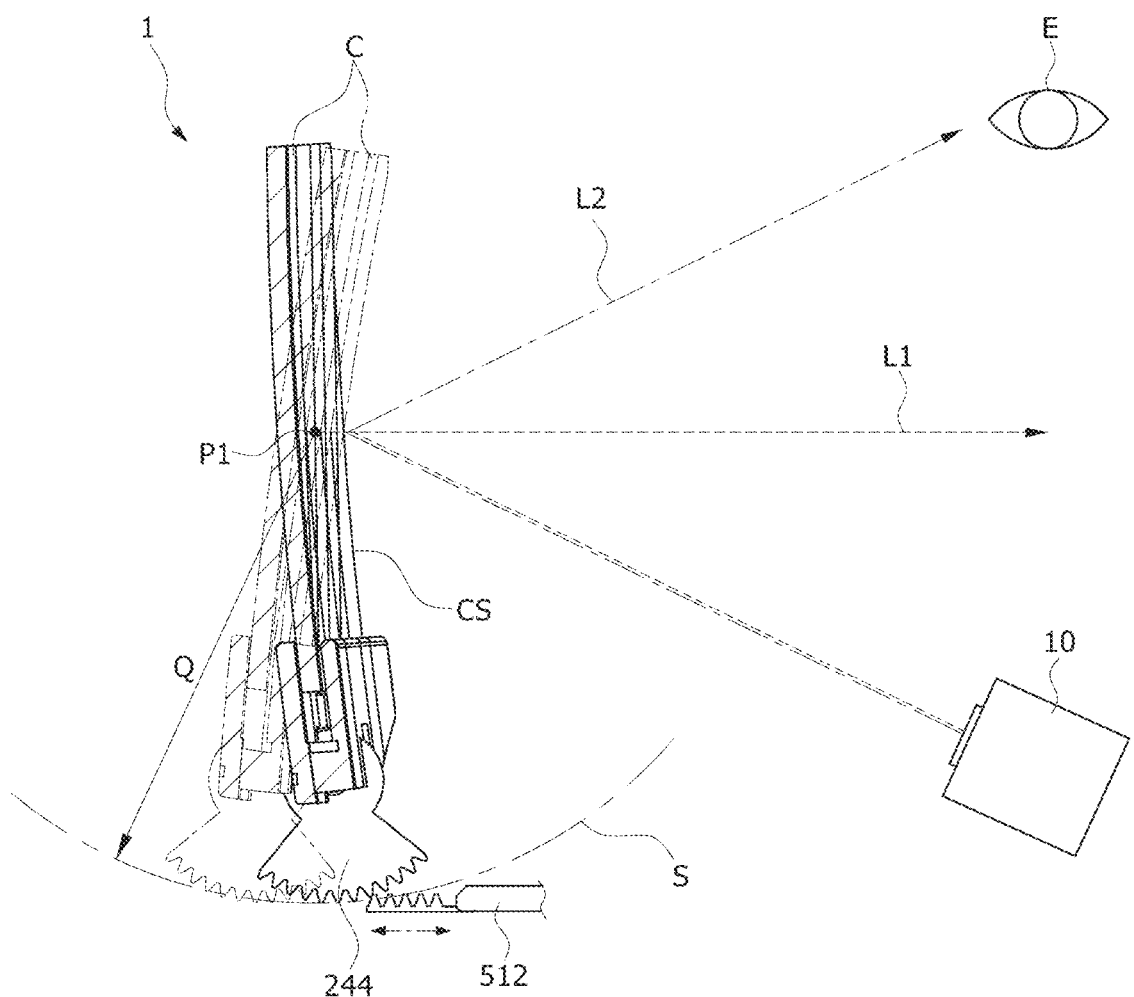
FIG. 14 is a diagram illustrating a displacement based on the tilting of the combiner according to an embodiment of the present disclosure.

In FIG. 14, E is the location of a user's eye, L1 and L2 are the light paths of display light emitted by the display module 10, and CS is the reflection plane of the combiner C from which a virtual image is reflected. Referring to FIG. 14, in the HUD 1 for a vehicle according to an embodiment, the combiner C is tilted with respect to the center axis P1, and thus a moving trajectory S under the combiner C may become an arc of a radius Q having the center axis P1 as its center.

Accordingly, although the angle of the combiner C is changed, the deformation in a virtual image seen by a user can be minimized because the reflection position of display light emitted by the display module 10 is rarely changed on a reflection plane CS. Therefore, the present disclosure can contribute to safe driving because a user can be prevented from feeling eye strain caused by misrecognizing a distorted virtual image or watching a distorted virtual image. Furthermore, the manufacturing cost of the HUD for a vehicle can be reduced because an expensive aspheric combiner capable of correcting a deformation in a virtual image is not necessary.

That is, as described above, in the HUD 1 for a vehicle according to an embodiment, the combiner C may be rotated around the virtual center axis P1 that traverses the combiner C left and right. Accordingly, in the HUD 1 for a vehicle according to an embodiment, a light path along which a virtual image generated by the display module and reflected by the combiner C moves can be controlled easily. Accordingly, a driver can watch the virtual image reflected by the combiner C more clearly.

Furthermore, in the HUD 1 for a vehicle according to an embodiment, the sliding member 510 of the tilting unit 500 can be moved minutely by the driving unit 400. Furthermore, the holder member 240 can be coupled to the sliding member 510 in a rack and pinion manner and tilted precisely while being guided along the tilting guide member 260. Accordingly, resolution of the combiner C can be improved significantly compared to a conventional HUD for a vehicle.

Figure 15:
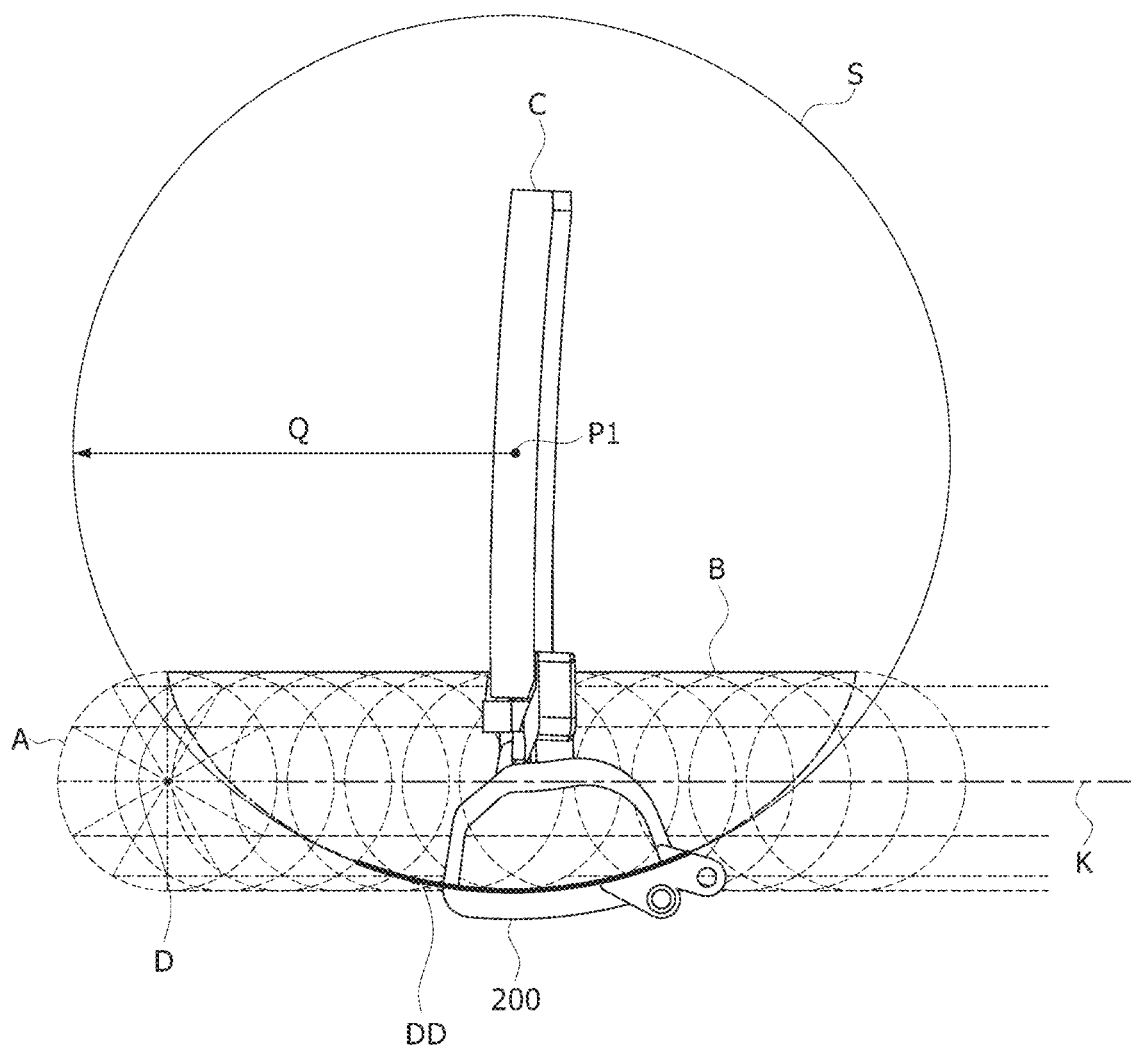
FIG. 15 is a diagram schematically illustrating the cycloid curve of the combiner according to an embodiment of the present disclosure.
Figure 16:
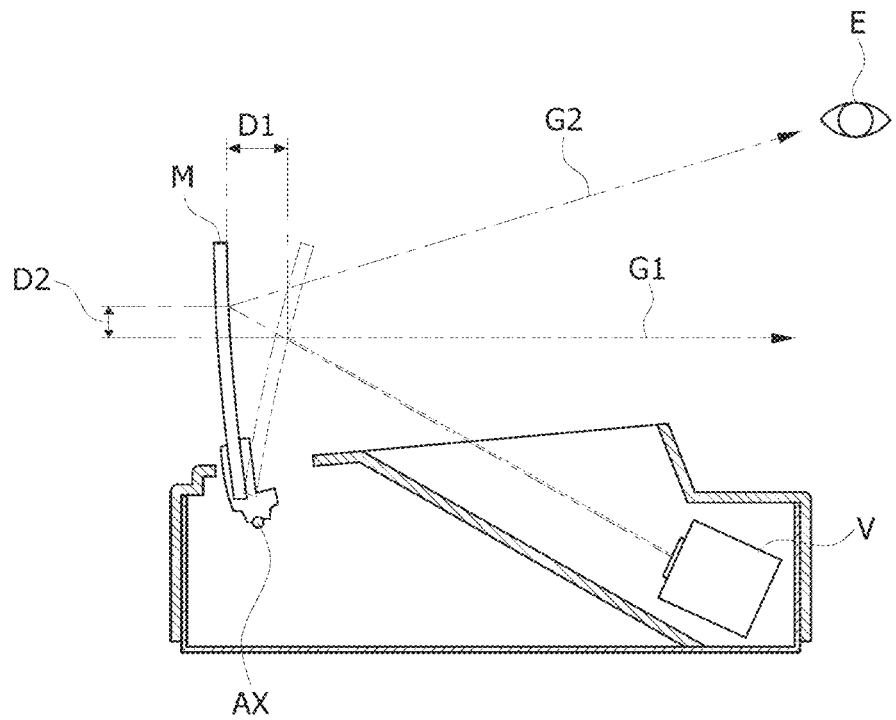
FIG. 16 is a diagram illustrating a rotation displacement of a combiner in a conventional HUD for a vehicle.

Referring to FIGS. 14 and 15, the pinion unit 244 and the rack gear unit 512 are positioned so that the combiner C can operate on a cycloid curve DD approximate to the moving trajectory S in which the combiner C is tilted based on the center axis P1. That is, the bottom of the pinion unit 244 becomes a gear having an arc shape. If the rack gear unit 512 is moved rectilinearly by the driving of the tilting unit 500 and engaged with the pinion unit 244, the combiner C can be tilted on the cycloid curve DD approximate to the moving trajectory S in which it is tilted based on the center axis P1.

A cycloid curve D is drawn while a virtual circle A is rotated based on an upper baseline B. The cycloid curve DD that belongs to the cycloid curve D and that is approximate to the moving trajectory S in which the combiner C is tilted based on the center axis P1 can be implemented. In this case, K means the center line of the virtual circle A that moves horizontally, and may correspond to the central part of the rotation of the pinion unit 244.

In the HUD for a vehicle according to an embodiment, the combiner can be rotated around a virtual center axis that traverses the combiner left and right. Accordingly, in the HUD for a vehicle according to an embodiment, a light path along which a virtual image generated by the display module and reflected by the combiner moves can be controlled easily, and a driver can watch the virtual image reflected by the combiner more clearly.

Furthermore, in the HUD for a vehicle according to an embodiment, the sliding member of the tilting unit can be moved minutely by the driving unit. Furthermore, resolution of the combiner can be improved significantly compared to a conventional HUD for a vehicle because the holder member can be coupled to the sliding member in a rack and pinion manner and tilted precisely while being guided along the tilting guide member.

Although some embodiments of the present disclosure have been described, the drawings and detailed description of the present disclosure are merely illustrative, and they are used to only describe the present disclosure and are not used to limit their meanings or the range of the present disclosure written in the claim. Accordingly, those skilled in the art will understand that various modifications and other equivalent embodiments are possible from the embodiments. Accordingly, the true technical range of protection of the present disclosure should be determined by the technical spirit of the following claims.

What is claimed is:

1. A head-up display for a vehicle, comprising:
a housing having an internal space formed therein, wherein an entrance is formed on one side of the housing;
a holder unit having a combiner coupled to one side of the holder unit, wherein the combiner enters or exits through the entrance;
a moving unit positioned in the internal space of the housing, rotatably coupled to the holder unit, and coupled to the housing in such a way to reciprocate, wherein when the moving unit reciprocates, the combiner is received in the internal space of the housing or exposed externally through the entrance of the housing;
a driving unit coupled to the moving unit and configured to move the moving unit; and
a tilting unit coupled to the moving unit in such a way to slide and coupled to the driving unit,
wherein when the tilting unit is moved by the driving unit, the combiner is tilted to form a cycloid trajectory with respect to a virtual vertical center axis that horizontally traverses the combiner.

2. The head-up display of claim 1, wherein the holder unit comprises:
a holder shaft mounted on the moving unit;
a holder rotation member coupled to the holder shaft;
a holder member to which the combiner is coupled; and
a tilting guide member coupled to the holder shaft and configured to guide a tilting of the holder member.

3. The head-up display of claim 2, wherein the holder shaft operates in conjunction with the moving unit through the moving unit, wherein both ends of the holder shaft have squared shapes and are mounted on the holder rotation member and the tilting guide member, respectively.

4. The head-up display of claim 2, wherein the holder rotation member comprises:
a first holder rotation unit on which the holder shaft is mounted; and
a second holder rotation unit positioned in the first holder rotation unit, wherein the holder member is inserted into the second holder rotation unit to limit the tilting of the holder member.

5. The head-up display of claim 2, wherein the holder member comprises:
a holder unit to which the combiner is coupled;
an arc unit through which the holder shaft penetrates;
an arc protrusion unit protruding from the arc unit and inserted into the holder rotation member; and
a pinion unit downward extended from the holder unit, having a set of teeth formed on curvature of the pinion unit, and engaged with the tilting unit.

6. The head-up display of claim 2, wherein the tilting guide member comprises:
a first tilting guide unit to which the holder shaft is coupled;
a second tilting guide unit upward extended from both ends of the first tilting guide unit;
a third tilting guide unit having both ends coupled to the second tilting guide unit; and
a fourth tilting guide unit penetrated by the third tilting guide unit and rotatably mounted on the holder member.

7. The head-up display of claim 2, wherein:
the holder unit comprises a guide pin protruding from an outside of the holder rotation member, and
a guide groove for entrance and exit is formed in a portion of the housing that comes into contact with the guide pin and provides a movement route of the holder rotation member.

8. The head-up display of claim 2, wherein the tilting unit comprises a sliding member coupled to the moving unit in such a way to slide, moved by the driving unit in a state in which a movement of the moving unit has been stopped, and configured to apply an external force to the holder member so that the holder member is tilted.

9. The head-up display of claim 8, wherein the sliding member comprises:
a sliding plate unit moved by the driving unit; and
a rack gear unit protruding from the sliding plate unit and geared with the holder member.

10. The head-up display of claim 8, wherein:
a second guide groove through which the driving unit penetrates is formed in the sliding member, and
the second guide groove comprises:
a second movement route formed at an edge of the sliding member and configured to enable the sliding member to move along with the moving member as the driving unit moves; and
a tilting route connected to the second movement route and having a radius of curvature different from a radius of curvature of a moving trajectory of the driving unit.

11. The head-up display of claim 8, wherein the virtual vertical center axis horizontally traversing the combiner is an axis which prevents a position where display light is reflected from being changed on a reflection plane of the combiner although the combiner is tilted.

12. The head-up display of claim 1, wherein the driving unit comprises:
a rotation motor;
a rotation member rotated by the rotation motor; and
a driving pin positioned on one side of the rotation member and positioned to penetrate the moving unit and the tilting unit.

13. The head-up display of claim 12, wherein the moving unit comprises a moving member coupled to the housing in such a way to slide, wherein a first guide groove through which the driving pin penetrates is formed in the moving member.

14. The head-up display of claim 13, wherein the first guide groove comprises:
- a first movement route formed at an edge of the moving member and configured to enable the moving member to move in one direction as the driving pin is moved; and
- a pause route connected to the first movement route and having a radius of curvature corresponding to a radius of curvature of a moving trajectory of the driving pin.

15. The head-up display of claim 1, further comprising a sensing unit positioned in the internal space of the housing and configured to detect a location of the moving unit,
- wherein the sensing unit detects that the combiner is inserted into the internal space of the housing or exposed to an outside of the housing based on the detected location of the moving unit.

16. The head-up display of claim 15, wherein the sensing unit comprises:
- a first position detection member coupled to one side of the internal space of the housing and configured to detect a location of the moving unit; and
- a second position detection member coupled to the other side of the internal space of the housing and configured to detect the location of the moving unit.

* * * * *